United States Patent

Kitahara et al.

[11] Patent Number: 5,563,196
[45] Date of Patent: Oct. 8, 1996

[54] WET FRICTIONAL MATERIAL

[75] Inventors: Shun Kitahara; Fumimasa Muramatsu; Shigeki Umezawa, all of Shizuoka; Mitsuhiro Takarada; Tadashi Takahashi, both of Gunma, all of Japan

[73] Assignees: NSK-Warner Kabushiki Kaisha; Shin-Etsu Chemical Co., Ltd., both of Tokyo, Japan

[21] Appl. No.: 365,763

[22] Filed: Dec. 28, 1994

[30] Foreign Application Priority Data

Dec. 28, 1993 [JP] Japan ................................ 5-354623

[51] Int. Cl.$^6$ .................................................. C08L 83/06
[52] U.S. Cl. .................... 524/14; 524/15; 524/16; 524/35
[58] Field of Search .................. 524/15, 14, 16, 524/35

[56] References Cited

U.S. PATENT DOCUMENTS 4,364,997  12/1982  Yamamoto et al. ..................... 524/15
4,657,951  4/1987  Takarada et al. .

FOREIGN PATENT DOCUMENTS 55-92738  7/1980  Japan .
60-28484  2/1985  Japan .
61-192711  8/1986  Japan .

*Primary Examiner*—Melvyn I. Marquis
*Attorney, Agent, or Firm*—Sughrue, Mion, Zinn, Macpeak & Seas

[57] ABSTRACT

A wet frictional material having a high heat resistance, excellent durability and superior initial conformability. The wet frictional material contains a fiber base material, a filler, a frictional adjustment agent and a thermosetting synthetic resin. The thermosetting synthetic resin comprises a silicone resin represented by the following average formula. The silicone resin contains a trifunctional unit ($RSiO_{3/2}$) (where R represents a substituted or unsubstituted monovalent hydrocarbon group) in an amount of from 40 to 100 mol % of units constituting the silicone resin:

$$(R^1)_a(OR^2)_b SiO_{(4-a-b)/2}$$

where $R^1$ represents a substituted or unsubstituted monovalent hydrocarbon group, and $R^2$ represents a hydrogen atom or an organic group having from 1 to 10 carbon atoms, and $0.2 \leq a \leq 1.8$ and $0 < b \leq 1.0$).

7 Claims, 2 Drawing Sheets

WET FRICTIONAL MATERIAL

FIELD OF THE INVENTION

The present invention relates to a wet frictional material for use in a clutch or the like, and particularly to a wet frictional material suitable for use in an oil environment.

BACKGROUND OF THE INVENTION

A friction clutch has been widely used as a clutch for a transmission of a vehicle such as a car, a railway vehicle or the like. A frictional material for use in a friction clutch has been obtained in a technique where a fiber base material such as natural pulp fibers, organic synthetic fibers, inorganic fibers, or the like, and a filler or a frictional adjustment agent such as diatomaceous earth, cashew resin, or the like, are formed by wet sheet making, impregnated with a thermosetting synthetic resin such as phenol resin, or the like, dried and compression-molded.

Such frictional materials are classified into two types, including a dry frictional material that is used in a dry state and a wet frictional material that is used in oil as described above. Each of these has been suitably developed for their respective applications.

Although various kinds of synthetic thermosetting resins have been used in such frictional materials, phenol resin has been widely used for a variety of reasons such as heat resistance, abrasion resistance, handleability, price, etc. The phenol resin for use in a frictional material is modified with various kinds of resins in order to improve the characteristics thereof. There are many kinds of useful modified phenol resins. For example, linear organopolysiloxane is bonded with novolac phenol resin so as to improve elasticity, tension propagation and tensile strength as described in JP-A-55-92738 (the term "JP-A" as used herein means an unexamined published Japanese patent application).

However, when phenol resin is modified with linear organopolysiloxane in this manner, its softening point drops to deteriorate the solvent resistance. In addition, cracking occurs in organopolysiloxane to thereby produce siloxane of a low molecular weight which undesirably imparts slip characteristics to a frictional material. Therefore, according to another proposal, in order to obtain a binder having superior heat resistance and abrasion resistance, a frictional material containing a modified phenol resin as described above is manufactured using a binder, the main component of which is phenol resin modified with an organopolysiloxane containing a $R^1SiO_{1.5}$ unit (where $R^1$ represents the same or different, substituted or unsubstituted monovalent hydrocarbon group having from 1 to 8 carbon atoms) and/or an $SiO_2$ unit in a molecule thereof as described in JP-A-61-192711.

In addition, according to another proposal, in a clutch facing with component substances such as fiber substances, abrasion resistant powder, metal wires or metal powder and binders, another binder is also used together with a conventional binder such as phenol-formaldehyde resin, melamine-formaldehyde resin, melamine/phenol-formaldehyde resin, SBR, NBR, natural rubber, or the like, so that silicone resin is present in an amount of from 0.1 to 10 weight % of the clutch facing as described in JP-A-60-28484.

With this arrangement, a clutch facing which resists moisture absorption can be obtained. Although JP-A-60-28484 teaches that the silicone resin used therein is not limited so long as it is a silicone resin having a moisture barrier effect, JP-A-60-28484 only exemplifies dimethylsiloxane-system silicone resin, and fails to describe the technical content thereof in detail.

In recent automatic transmissions for cars, energy and environmental considerations require a slip control on the friction clutch or a reduction in ATF (automatic transmission oil) friction in order to reduce fuel expense and to provide a smoother gear change.

However, the use of a slip control or reduction in ATF friction necessitate a frictional material having higher heat resistance, durability and strength. Conventional clutches are also disadvantageous in that slipping appears during engagement due to scorching or separation of a friction surface, or a decrease of its friction coefficient to thereby cause burning. Therefore, there is a need to solve this problem.

Although a variety of techniques may be considered as measures for solving these problems, including increasing the friction area by increasing the number of frictional plates or enlarging the diameter of a clutch, increasing the clutch control oil pressure, etc., each of these methods undesirably increases the size of the automatic transmission. Thus, there is a need in the art to provide another solution to the above described problems which does not adversely affect other aspects of the transmission.

SUMMARY OF THE INVENTION

It is therefore an object of the present invention to solve the foregoing problems.

It is another object of the invention to provide a wet frictional material having superior heat resistance and durability, and having a large torque transmission capacity.

The above objectives are achieved by the following embodiments of the present invention.

(1) A wet frictional material containing a fiber base material, a filler, a frictional adjustment agent and a thermosetting synthetic resin, wherein the thermosetting synthetic resin comprises a silicone resin represented by the following average formula, the silicone resin containing a trifunctional unit ($RSiO_{3/2}$) (where R represents a substituted or unsubstituted monovalent hydrocarbon group) in an amount of from 40 to 100 mol % of units constituting the silicone resin:

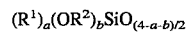

where $R^1$ represents a substituted or unsubstituted monovalent hydrocarbon group, and $R^2$ represents a hydrogen atom or an organic group having from 1 to 10 carbon atoms, and a and b are positive numbers satisfying the relationships $0.2 \leq a \leq 1.8$ and $0 < b \leq 1.0$.

(2) The wet frictional material described in (1) above, wherein methyl groups constitute from 20 to 100 mol % of the monovalent hydrocarbon groups represented by $R^1$ that are contained in the silicone resin.

(3) The wet frictional material described in (1) above, containing the silicone resin in an amount of from 15 to 55 weight % of the wet frictional material.

DETAILED DESCRIPTION OF THE INVENTION

In more detail, the fiber base material for use in the wet frictional material of the present invention includes conventional fiber base materials such as natural pulp fibers, organic synthetic fibers, inorganic fibers or the like. Conventionally used fillers such as diatomaceous earth, cashew resin, or the like, may be used as the filler. The same also applies to the frictional adjustment agent. Specific examples of these components are described in U.S. Pat. No. 3,270,846.

The silicone resin for use in the present invention is represented by the following formula:

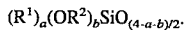

$(R^1)_a(OR^2)_b SiO_{(4-a-b)/2}$.

The present invention is characterized in that the silicone resin contains a trifunctional unit ($RSiO_{3/2}$) (where R represents a substituted or unsubstituted monovalent hydrocarbon group) in amount of from 40 to 100 mol % of units constituting the silicone resin. Furthermore, in the above formula, $R^1$ represents a substituted or unsubstituted monovalent hydrocarbon group, and $R^2$ represents a hydrogen atom or an organic group having from 1 to 10 carbon atoms, is 1 to 10, and a and b are positive numbers satisfying the relationships $0.2 \leq a \leq 1.8$ and $0 < b \leq 1.0$.

In the above formula, $R^1$ represents a substituted or unsubstituted monovalent hydrocarbon group having from 1 to 10 carbon atoms. Examples thereof include: an alkyl group such as a methyl group, an ethyl group, a propyl group, a butyl group and a decyl group; an aryl group such as a phenyl group and a tolyl group; an alkenyl group such as a vinyl group and an allyl group; a substitued alkyl group such as a trifluoropropyl group, a chloromethyl group, a chloropropyl group and a glycidoxypropyl group. A methyl group and a phenyl group are preferred for industrial use. A combination of two or more kinds of the above-described substituent groups may be used as $R^1$.

$R^2$ represents a hydrogen atom or an organic group having from 1 to 10 carbon atoms. Examples of the organic group include: an alkyl group such as a methyl group, an ethyl group, a propyl group, an isopropyl group and an isobutyl group; an alkenyl group such as a vinyl group, an allyl group and an isopropenyl group; an oxime residue group such as a butylene amino group and an isobutylene amino group. A combination of two or more kinds of the above-described substituent groups may be used as $R^2$.

Figure 2:
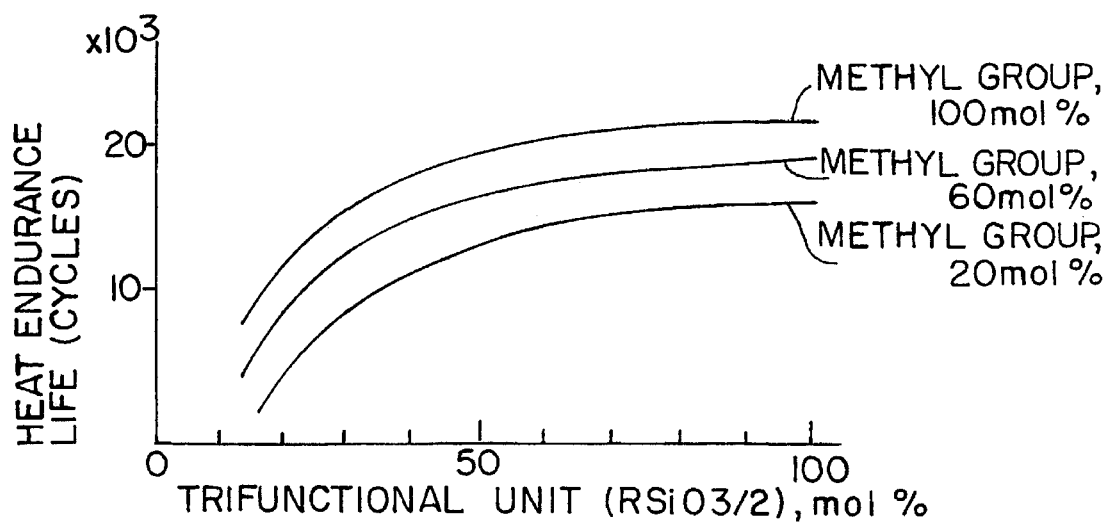
FIG. 2 is a graph showing the relationship between the trifunctional unit ($RSiO_{3/2}$) content of the silicone resin in mol %, the ratio of methyl groups to other groups represented by $R^1$ of the silicone resin and the heat endurance life of the wet frictional material of the present invention.

In the above formula, a and b are positive numbers satisfying the relationships $0.2 \leq a \leq 1.8$ and $0 < b \leq 1.0$. The silicone resin for use in the present invention necessarily contains a trifunctional unit ($RSiO_{3/2}$) (where R represents a substituted or unsubstituent monovalent hydrocarbon group) in an amount of from 40 to 100 mol % of the units constituting the silicone resin. In amounts of less than 40 mol %, the heat endurance life is considerably reduced as shown in FIG. 2. R represents a substituted or unsubstituent monovalent hydrocarbon group.

Figure 3:
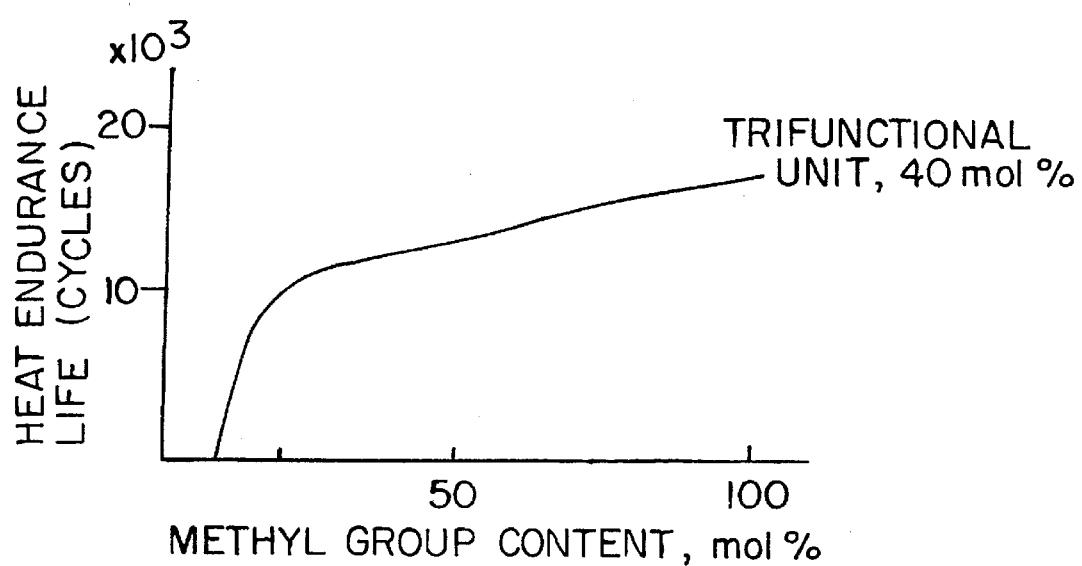
FIG. 3 As a graph showing the relationship between the ratio of methyl groups to other groups represented by $R^1$ of the silicone resin and the heat endurance life of the wet frictional material of the present invention where the trifunctional unit ($RSiO_{3/2}$) content of the silicone resin is held constant.

Of the silicone resins for use in the present invention, those which contain 20 to 100 mol % of methyl groups as the monovalent group represented by $R^1$ have superior durability. In amounts of less than 20 mol %, the heat resistance and durability are considerably reduced as shown in FIG. 3. In comparison with a conventional frictional material containing phenol resin, the present invention provides a wet friction clutch having a high friction coefficient, superior initial conformability and high durability.

In order to further improve durability, preferably from 20 to 100 mol % of the monovalent hydrocarbon groups represented by $R^1$ are methyl groups. $R^1$ may also be an alkyl group such as an ethyl group, preferably, a methyl group. $R^1$ may also be a monovalent aromatic group, preferably, a phenyl group.

The molecular weight of the silicone resin of the present invention is preferably within the range of from $10^3$ to $10^6$. Generally, the wet frictional material of the present invention contains the silicone resin in an amount of from 15 to 55 weight % based on the weight of the wet frictional material. However, the content thereof may be more or less depending on the intended application.

The wet frictional material of the present invention may contain another thermosetting synthetic resin such as modified phenol resin, or the like, in addition to the silicone resin of the present invention. The content thereof is desirably selected within a range so that the objects of the present invention are attained.

The above-mentioned organic substituent group $R^1$ includes a relatively large proportion of methyl groups and a relatively small proportion of phenyl groups in the silicone resin of the wet frictional material of the present invention in order to improve the heat resistance.

Further, the content of the above-described trifunctional unit is increased in the silicone resin in order to improve the heat resistance.

Based of the above factors, an optimum composition and combination of the wet frictional material of the present invention is established that is most suitable for the particular conditions applied to the wet frictional material.

Silicone resin has siloxane bond (Si—O—Si) in its main chain. This siloxane bond has a large bond distance between a silicone atom and an oxygen atom, and has a low electron density, so that the bond can easily rotate. Therefore, silicone resin is very flexible and soft. By incorporating such silicone resin in a wet frictional material, the surface of the frictional material is made smooth and soft. Consequently, the contact area with a partner frictional plate is increased, to thereby provide a high torque capacity.

The siloxane bond has a very large Si—O bond energy namely, 106 kcal/mol, and is therefore stable in comparison with a C—C bond (81 kcal/mol). Because of this large bond energy, silicone resin does not tend to decompose, change in color, or otherwise deteriorate, even if the silicone resin is subjected to high temperatures for a long period of time. In addition, silicone resin is also stable against frictional heat generated in its frictional sliding surface, to thereby restrain carbonization, grazing, etc. Accordingly, the heat resistance and durability of the wet frictional material is improved to a considerable extent.

On the other hand, if the silicone resin has a high affinity to inorganic substances contained in a paper used as a base material, and if the silicone resin is heated to its decomposition temperature or higher, an Si—O bond is formed with the inorganic substances so as to form a structure that is more stable against heat. The silicone resin can endure a high temperature of 500° C. or more.

Furthermore, because the softness of silicone resin optimizes the distortability of a frictional material, the friction coefficient μ thereof is stabilized. Accordingly, it is possible to obtain a wet frictional material having a friction coefficient μ that remains higher and more stable in its initial cycles. Also, gear change shock is reduced, and tuning is easy in practical use. Although it has been necessary to grind a conventional frictional material by sand paper treatment or the like before use in order to provide stable frictional characteristics from the beginning of use, the wet frictional material of the present invention provides stable frictional characteristics from the beginning of use without grinding. Thus, the inventive frictional material exhibits superior initial conformability. Also, grinding to provide such conformability is not necessary.

The present invention is described in greater detail below by reference to the following Examples. However, the present invention should not be construed as being limited to these Examples:

| Inventive Example 1: | |
|---|---|
| Natural pulp and organic synthetic fiber: | 40 weight % |
| Cellulose fiber | 25 weight % |
| Polyamide fiber | 15 weight % |
| Frictional adjustment agent and filler | 30 weight % |
| Cashew dust | 10 weight % |
| Diatomaceous earth | 20 weight % |
| Silicone resin | 30 weight % |
| Average formula thereof $(CH_3)_{1.30}SiO_{1.26}(OH)_{0.12}(OCH_3)_{0.06}$ trifunctional unit $(RSiO_{3/2})$ content | 70 mol % |
| Methyl group content | 100 mol % |

A sheet made of a slurry containing the natural pulp, organic synthetic fiber, cashew dust frictional adjustment agent and diatomaceous earth filler in the above-described ratios was dried, impregnated with the above-described silicone resin, and dried. The dried sheet was held in a metal mold heated to 170° C. under a pressure of not less than 200 kg/cm² for 30 minutes, and thereby bonded with a disc plate made from a metal plate. The wet frictional material thus prepared had a diameter of 130 mm and thickness of 2.3 mm.

| Inventive Example 2: | |
|---|---|
| Natural pulp and organic synthetic fiber: | 40 weight % |
| Cellulose fiber | 25 weight % |
| Polyamide fiber | 15 weight % |
| Frictional adjustment agent and filler | 30 weight % |
| Cashew dust | 10 weight % |
| Diatomaceous earth | 20 weight % |
| Silicone resin | 30 weight % |
| Average formula thereof $(CH_3)_{0.56}(C_6H_5)_{0.84}SiO_{1.21}(OH)_{0.12}(OCH_3)_{0.06}$ trifunctional unit $(RSiO_{3/2})$ content | 60 mol % |
| Methyl group content | 40 mol % |

A sheet made of a slurry containing the natural pulp, organic synthetic fiber, cashew dust frictional adjustment agent and diatomaceous earth filler in the above-described ratios was dried, impregnated with the above-described silicone resin, and dried. The dried sheet was held in a metal mold heated to 170° C. under a pressure of not less than 200 kg/cm² for 30 minutes, and thereby bonded with a disc plate made from a metal. The wet frictional material thus prepared had a diameter of 130 mm and a thickness of 2.3 mm.

| Comparative Example 1: | |
|---|---|
| Natural pulp and organic synthetic fiber: | 40 weight % |
| Cellulose fiber | 25 weight % |
| Polyamide fiber | 15 weight % |
| Frictional adjustment agent and filler | 30 weight % |
| Cashew dust | 10 weight % |
| Diatomaceous earth | 20 weight % |
| Phenol resin | 30 weight % |

A sheet made of a slurry containing the natural pulp, organic synthetic fiber, cashew dust frictional adjustment agent and diatomaceous earth filler at the above-described ratios was dried, impregnated with the phenol resin, and dried. The dried sheet was held in a metal mold heated to 170° C. under a pressure of not less than 200 kg/cm² for 30 minutes, and thereby bonded with a disc plate made from a metal plate. The wet frictional material thus prepared had a diameter of 130 mm and a thickness of 2.3 mm.

| Comparative Example 2: | |
|---|---|
| Natural pulp and organic synthetic fiber: | 40 weight % |
| Cellulose fiber | 25 weight % |
| Polyamide fiber | 15 weight % |
| Frictional adjustment agent and filler | 30 weight % |
| Cashew dust | 10 weight % |
| Diatomaceous earth | 20 weight % |
| Silicone resin | 30 weight % |
| Average formula thereof $(CH_3)_{0.17}(C_6H_5)_{1.53}SiO_{1.06}(OH)_{0.12}(OCH_3)_{0.06}$ trifunctional unit $(RSiO_{3/2})$ content | 30 mol % |
| Methyl group content | 10 mol % |

A sheet made of a slurry containing the natural pulp, organic synthetic fiber, cashew dust frictional adjustment agent and diatomaceous earth filler at the above-described ratios was dried, impregnated with the above-described silicone resin, and dried. The dried sheet was held in a metal mold heated to 170° C., under a pressure of not less than 200 kg/cm² for 30 minutes, and thereby bonded with a disc plate made from a metal plate. The wet frictional material thus prepared had a diameter of 130 mm and a thickness of 2.3 mm.

Figure 1:
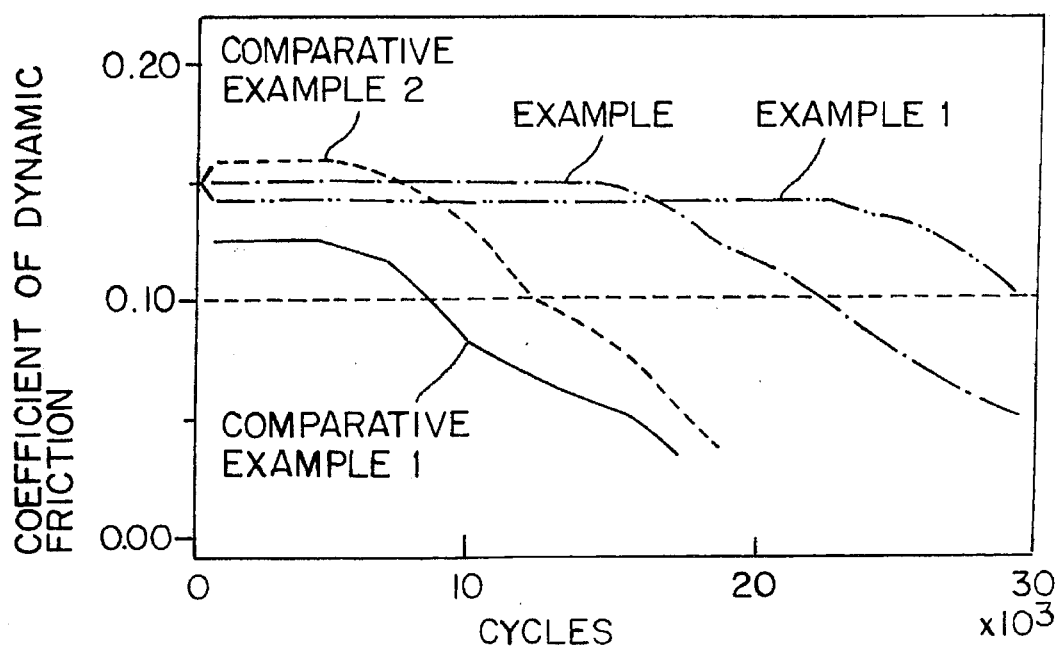
FIG. 1 is a graph showing the relationship between the number of engagement cycles and the coefficient of dynamic friction of the frictional materials of Inventive Examples 1 and 2 and Comparative Examples 1 and 2.

Experiments:

Friction experiments were carried out on the frictional materials obtained in Inventive Examples 1 and 2 and Comparative Examples 1 and 2. In each experiment, the change in coefficient of dynamic friction was measured as a function of the number of engagement cycles. FIG. 1 shows the measurement results thereof. In addition, heat endurance life measurements were carried out on wet frictional materials as a function of both the ratio of methyl groups to other groups represented by $R^1$ of the silicone resin and the trifunctional unit $(RSiO_{3/2})$ content. FIG. 2 shows the measurement results thereof. In addition, heat endurance life were carried out on wet frictional materials as a function of the ratio of methyl groups to other gorups represented by $R^1$ of the silicone resin, and where the trifunctional unit content of the silicone resin was held constant. FIG. 3 shows the results thereof.

The wet frictional material of the present invention contains a silicone resin represented by the above-described specific average formula, and the content of trifunctional units $(RSiO_{3/2})$ constituting the silicone resin is from 40 to 100 mol %. As a result, a wet frictional material is obtained having a high heat resistance and good durability.

The coefficient of dynamic friction of the wet frictional material of the present invention remains stable upon use and does not deteriorate over a long period of time. Thus, the wet frictional material of the present invention has a long operating life.

As shown in FIG. 3, by using a silicone resin having a high ratio of methyl groups to other organic substituent groups represented by $R^1$ in its average formula, it is possible to obtain a wet frictional material having a long heat endurance life. In addition, by using a silicone resin having a high trifunctional unit $(RSiO_{3/2})$ content, it is possible to obtain a wet frictional material having a long endurance life. When both of these parameters are satisfied in accordance with the present invention, the resulting wet frictional material has a long heat endurance life.

Thus, both the ratio of methyl groups represented by $R^1$ and the trifunctional unit $(RSiO_{3/2})$ content are important for achieving a preferred embodiment of this invention.

In addition, the wet frictional material of the present invention has a superior initial conformability, so that a stable and predetermined coefficient of friction is obtained from the beginning of use. Accordingly, it is unnecessary to apply a conformity treatment such as sand paper treatment or the like to the wet frictional material of the present invention.

While the invention has been described in detail and with reference to the specific embodiments thereof, it will be apparent to one skilled in the art that various charges and modifications can be made thereto without departing from the spirit and scope thereof.

What is claimed is:

1. A wet frictional material containing a fiber based material, a filler, a frictional adjustment agent and a thermosetting synthetic resin, said thermosetting synthetic resin comprising a silicone resin represented by $$(R^1)_a(OR^2)_bSiO_{(4-a-b)/2}$$

where $R^1$ represents a substituted or unsubstituted monovalent hydrocarbon group, and $R^2$ represents a hydrogen atom or an organic group having from 1 to 10 carbon atoms, and $0.2<a<1.8$ and $0<b<1.0$;

and said silicone resin contains a trifunctional unit $(RSiO_{3/2})$ wherein R represents a substituted or unsubstituted monovalent hydrocarbon group in an amount of from 40 to 100 mol % of units constituting said silicone resin.

2. The wet frictional material according to claim 1, wherein methyl groups constitute from 20 to 100 mol % of said monovalent hydrocarbon groups represented by $R^1$ that are contained in said silicone resin.

3. The wet frictional material according to claim 1, containing said silicone resin in an amount of from 15 to 55 weight %.

4. The wet frictional material according to claim 1, wherein methyl groups constitute from 60 to 100 mol % of monovalent hydrocarbon groups represented by $R^1$ that are contained in the silicone resin.

5. The wet frictional material according to claim 1, wherein the monovalent hydrocarbon group represented by $R^1$ is selected from the group consisting of an alkyl group, an aryl group and an alkenyl group.

6. The wet frictional material according to claim 1, wherein $R^1$ is selected from the group consisting of a methyl group and phenyl group.

7. The wet frictional material according to claim 1, wherein the organic group represented by $R^2$ is selected from the group consisting of an alkyl group, an alkenyl group and an oxime group.

* * * * *